(12) United States Patent
Naruse et al.

(10) Patent No.: US 10,199,163 B2
(45) Date of Patent: Feb. 5, 2019

(54) GROUND-SIDE COIL UNIT

(71) Applicant: NISSAN MOTOR CO., LTD., Yokohama-shi, Kanagawa (JP)

(72) Inventors: Yuji Naruse, Kanagawa (JP); Yuusuke Minagawa, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/564,471

(22) PCT Filed: Apr. 8, 2015

(86) PCT No.: PCT/JP2015/060914
§ 371 (c)(1),
(2) Date: Oct. 5, 2017

(87) PCT Pub. No.: WO2016/162964
PCT Pub. Date: Oct. 13, 2016

(65) Prior Publication Data
US 2018/0082782 A1    Mar. 22, 2018

(51) Int. Cl.
| | |
|---|---|
| *H01F 38/14* | (2006.01) |
| *B60L 5/00* | (2006.01) |
| *H02J 50/12* | (2016.01) |
| *H01F 17/04* | (2006.01) |
| *H01F 27/38* | (2006.01) |
| *B60L 11/18* | (2006.01) |

(52) U.S. Cl.
CPC .............. *H01F 38/14* (2013.01); *B60L 5/00* (2013.01); *H01F 17/04* (2013.01); *H01F 27/38* (2013.01); *H02J 50/12* (2016.02); *B60L 11/182* (2013.01)

(58) Field of Classification Search
CPC .................................. H01F 38/14; H01F 17/04
USPC .................................................. 336/200, 232
See application file for complete search history.

(56) References Cited

U.S. PATENT DOCUMENTS

| | | | |
|---|---|---|---|
| 2008/0170350 A1* | 7/2008 | Koumoto | H01T 23/00 361/230 |
| 2012/0169139 A1* | 7/2012 | Kudo | H01J 17/00 307/104 |
| 2014/0285027 A1 | 9/2014 | Sakamoto et al. | |
| 2015/0145343 A1* | 5/2015 | Chiyo | H01F 27/38 307/104 |

FOREIGN PATENT DOCUMENTS

| | | | | |
|---|---|---|---|---|
| JP | 2010-93180 A | 4/2010 | | |
| JP | WO 2012157454 A1 * | 11/2012 | ............. | H02J 5/005 |
| JP | 2014-110726 A | 6/2014 | | |
| JP | 2014-183684 A | 9/2014 | | |
| JP | WO 2015025833 A1 * | 2/2015 | ............. | H01Q 1/243 |
| JP | 2015-56940 A | 3/2015 | | |

* cited by examiner

*Primary Examiner* — Tsz Chan
(74) *Attorney, Agent, or Firm* — Foley & Lardner LLP

(57) ABSTRACT

A ground-side coil unit is provided with: a magnetic material plate disposed adjacent to a power transmission coil that transmits electric power to a power reception coil in a wireless manner; and a first filter coil disposed facing the power transmission coil with the magnetic material plate interposed therebetween. The first filter coil is disposed in a position where a magnetic flux generated by the first filter coil cancels out a magnetic flux generated by the power transmission coil in the magnetic material plate.

10 Claims, 12 Drawing Sheets

(a)

(b)

(a)

(b)

(a)

(b)

(c)

(d)

(a)

(b)

(a)

(b)

(a)

(b)

(a)

(b)

(a)

(b)

GROUND-SIDE COIL UNIT

TECHNICAL FIELD

The present invention relates to a ground-side coil unit for use in a wireless power supply system for feeding power in a wireless manner between the ground-side coil unit and a vehicle-side coil unit.

BACKGROUND ART

There has heretofore been known a technology of disposing a magnetic core made of a ferromagnetic material adjacent to a coil having an approximately flat structure, thereby guiding, collecting, and orienting a magnetic flux formed by the coil (see Patent Literature 1).

CITATION LIST

Patent Literature

Patent Literature 1: Japanese Patent Application Publication No. 2010-93180
Patent Literature 2: Japanese Patent Application Publication No. 2014-183684

SUMMARY OF INVENTION

Technical Problem

The magnetic core of Patent Literature 1 has a portion where the magnetic flux generated by the coil is concentrated, and the increased magnetic flux density may heat the magnetic core.

Solution to Problem

The present invention has been made to solve the conventional problem as described above, and it is an object of the present invention to provide a ground-side coil unit that suppresses heat generation in a magnetic material plate by reducing the magnetic flux density increased inside the magnetic material plate adjacent to a power transmission coil.

A ground-side coil unit according to an aspect of the present invention includes: a magnetic material plate disposed adjacent to a power transmission coil that transmits electric power to a power reception coil in a wireless manner; and a first filter coil disposed facing the power transmission coil with the magnetic material plate interposed therebetween. The first filter coil is disposed in a position where a magnetic flux generated by the first filter coil cancels out a magnetic flux generated by the power transmission coil in the magnetic material plate.

DESCRIPTION OF EMBODIMENTS

Figure 1:
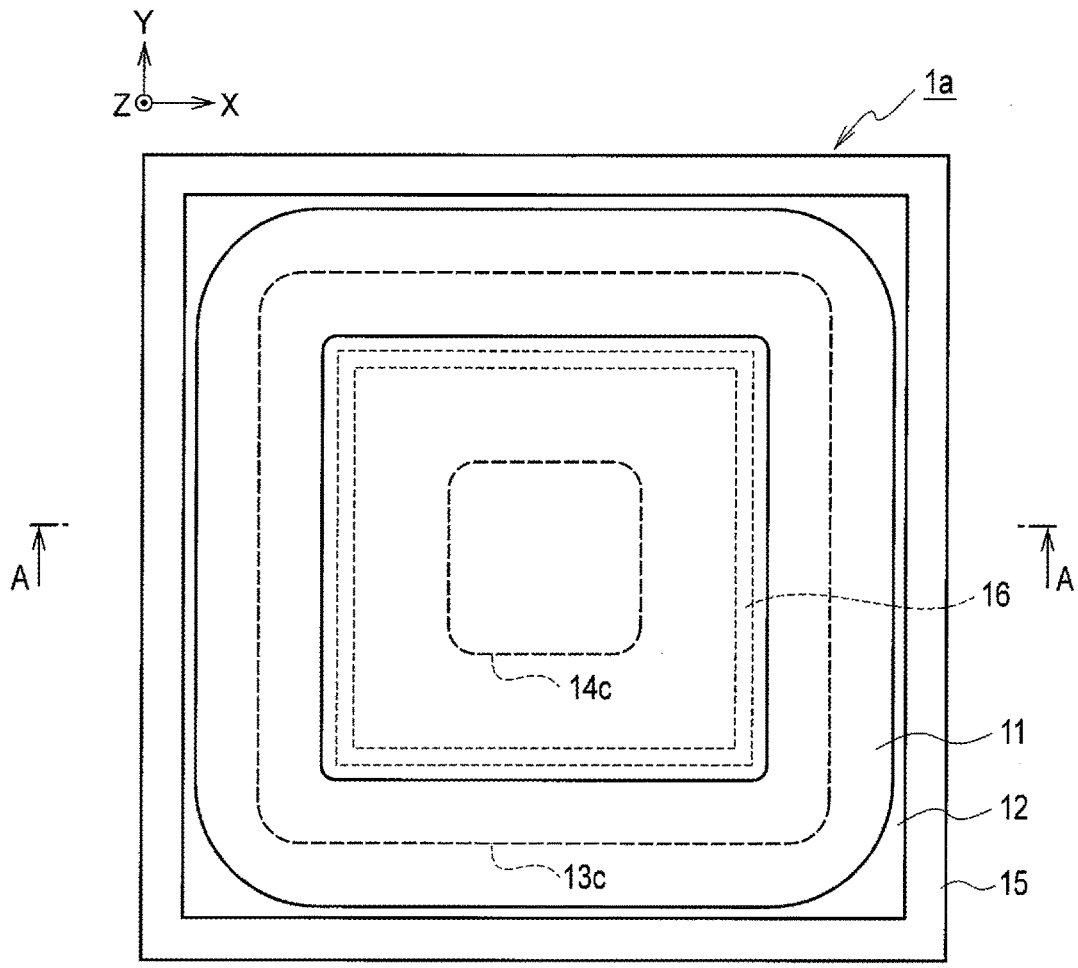
FIG. 1(a) is a top view showing a configuration of a ground-side coil unit according to a first embodiment.
FIG. 1(b) is a cross-sectional view taken along the line A-A in FIG. 1(a).
Figure 1:
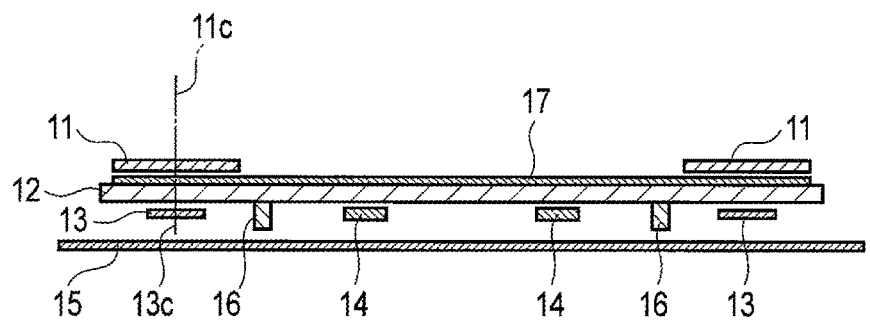

Embodiments are described below with reference to the drawings. The same members are denoted by the same reference numerals, and repetitive description thereof is omitted.

First Embodiment

A ground-side coil unit according to a first embodiment is a ground-side coil unit for use in a wireless power supply system for feeding power in a wireless manner between the ground-side coil unit and a vehicle-side coil unit. To be more specific, the wireless power supply system can feed power in a wireless manner from a coil (ground-side coil unit) buried in a road to a coil (vehicle-side coil unit) mounted near the bottom of a vehicle, by using electromagnetic induction or a resonance phenomenon. The fed electric power is transmitted to a battery (including a secondary battery) mounted on the vehicle, for example, and the battery is charged with the transmitted power.

First, with reference to FIGS. 1(a) and 1(b), description is given of a configuration of a ground-side coil unit 1a according to the first embodiment. The ground-side coil unit 1a includes: a power transmission coil 11 that transmits electric power to a power reception coil in a wireless manner; a magnetic material plate 12 disposed adjacent to the power transmission coil 11; and a first filter coil 13 disposed facing the power transmission coil 11 with the magnetic material plate 12 interposed therebetween.

The power transmission coil 11 is made of wires helically wound within a plane. The power transmission coil 11 shown in FIGS. 1(a) and 1(b) represents the outside diameter of the wires bundled together. When seen from a normal direction of the plane described above, the external shape of the power transmission coil 11 is a square shape. In other words, the external shape has four corners obtained by bending the wires with a finite curvature and four sides where the wires linearly extend without the finite curvature. The power transmission coil 11 of FIG. 1(a) has a square shape, but may also have a rectangular shape.

The magnetic material plate 12 is made of ferrite and has a flat plate shape. The power transmission coil 11 is disposed on a one main surface of the magnetic material plate 12 with an insulating sheet 17 interposed therebetween. The external shape of the magnetic material plate 12 is a square shape, which is larger than that of the power transmission coil 11.

As shown in FIG. 1(a), X-, Y-, and Z-axes are set such that an XY plane is parallel to the plane where the power transmission coil 11 is formed. The Z-axis is parallel to a direction of a magnetic flux passing through the power transmission coil 11. Note that the X-axis direction is parallel to a long-side direction of a parking space where the ground-side coil unit 1a is provided. Meanwhile, the Y-axis direction is parallel to a short-side direction (parking space width direction) of the parking space where the ground-side coil unit 1a is provided.

The first filter coil 13 is disposed adjacent to the other main surface facing the one main surface of the magnetic material plate 12. As in the case of the power transmission coil 11, the first filter coil 13 is made of wires helically wound within a plane. The first filter coil 13 of FIG. 1(b) represents the outside diameter of the wires bundled together. FIGS. 1(a) and 1(b) show a center in a winding width direction (hereinafter referred to as the "winding width center") 13c of the first filter coil 13. FIG. 1(b) also shows a winding width center 11c of the power transmission coil 11.

When seen from a normal direction (Z-axis direction) of the plane described above, the external shape of the first filter coil 13 is a square shape. In other words, the external shape has four corners obtained by bending the wires with a finite curvature and four sides where the wires linearly extend without the finite curvature.

In the first embodiment, when seen from the direction (Z-axis direction) of the magnetic flux passing through the power transmission coil 11, the winding width centers 13c of at least two of the sides of the first filter coil 13 correspond to the winding width center 11c of the power transmission coil 11. In the example shown in FIG. 1, the winding width centers 13c of the four sides of the first filter coil 13 correspond to the winding width centers 11c of the four sides of the power transmission coil 11.

The ground-side coil unit 1a further includes: a second filter coil 14; a magnetic material wall 16 that separates between the first filter coil 13 and the second filter coil 14; and a base plate 15. As in the case of the first filter coil 13, the second filter coil 14 is disposed adjacent to the other main surface facing the one main surface of the magnetic material plate 12. As in the case of the power transmission coil 11, the second filter coil 14 is made of wires helically wound within a plane, and represents the outside diameter of the wires bundled together. FIG. 1(a) shows a winding width center 14c of the second filter coil 14. The outer circumference of the second filter coil 14 is positioned on the inner side than the inner circumference of the power transmission coil 11. When seen from the normal direction (Z-axis direction) of the plane described above, the external shape of the second filter coil 14 is a square shape.

As in the case of the first and second filter coils 13 and 14, the magnetic material wall 16 is disposed adjacent to the other main surface facing the one main surface of the magnetic material plate 12. The magnetic material wall 16 is disposed on the inner side than the inner circumference of the first filter coil 13 and on the outer side than the outer circumference of the second filter coil 14. The magnetic material wall 16 reduces interference between the first and second filter coils 13 and 14 by magnetically blocking between the two coils (13 and 14). Furthermore, the magnetic material wall 16 supports the magnetic material plate 12, and forms a space for disposing the first filter coil 13 and the second filter coil 14 between the base plate 15 and the magnetic material plate 12. As shown in FIG. 1(a), the magnetic material wall 16 is made of ferrite and has a square shape when seen from the Z-axis direction.

The base plate 15 is a flat plate member made of a non-magnetic material such as aluminum, for example, and forms a space between the base plate 15 and the magnetic material plate 12 by supporting the magnetic material wall 16.

With reference to FIGS. 2(a) and 2(b), description is given of winding directions of the power transmission coil 11 and the first and second filter coils 13 and 14 shown in FIG. 1. FIG. 2(a) is a circuit diagram showing a configuration of a ground-side circuit corresponding to the ground-side coil unit 1a shown in FIG. 1. The ground-side circuit includes: an inverter 21 that outputs an AC voltage having a predetermined voltage and frequency; a filter circuit 27 that removes fundamental harmonic components from the AC voltage; and a ground resonance circuit 28 that feeds power to a power reception coil 26 in a wireless manner.

The ground resonance circuit 28 includes the power transmission coil 11, a capacitor 25 connected in parallel to the power transmission coil 11, and a capacitor 24 connected in series with the power transmission coil 11 and the capacitor 25, which are connected in parallel. The filter circuit 27 includes a first stage circuit connected on the inverter 21 side and a second stage circuit connected on the power transmission coil 11 side. The first stage circuit includes: the first filter coil 13 connected to one output terminal of the inverter 21; and a capacitor 22 connected between the other end of the first filter coil 13 and the other output terminal of the inverter 21. The second stage circuit includes: the second filter coil 14 connected in series with the other end of the first filter coil 13; and a capacitor 23 connected between the other end of the second filter coil 14 and the other output terminal of the inverter 21.

As described above, the first and second filter coils 13 and 14 are connected in series with one terminal of the power transmission coil 11. The second filter coil 14 is connected closer to the power transmission coil 11 than the first filter coil. The first filter coil 13 is connected closer to the inverter 21 than the second filter coil.

Figure 2:
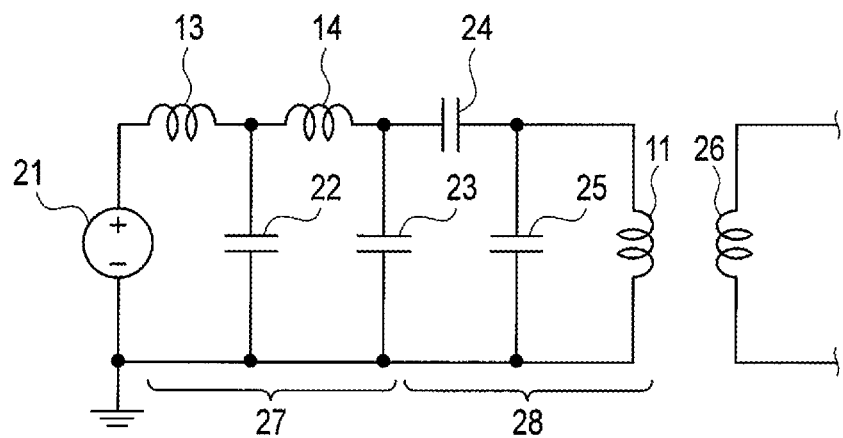
FIG. 2(a) is a circuit diagram showing a configuration of a ground-side circuit corresponding to the ground-side coil unit 1a shown in FIG. 1.
FIG. 2(b) is a perspective view showing winding directions of a power transmission coil 11, a first filter coil 13, and a second filter coil 14 shown in FIG. 2(a).
Figure 2:
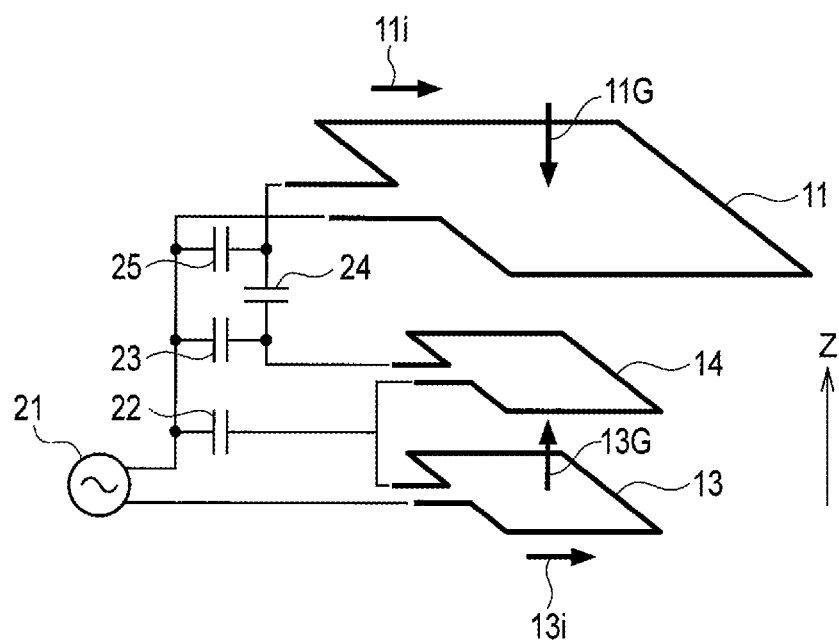

FIG. 2(*b*) is a perspective view showing the winding directions of the power transmission coil 11 and the first and second filter coils 13 and 14 shown in FIG. 2(*a*). The directions of currents (11*i* and 13*i*) in FIG. 2(*b*) represent a case where in-phase alternating currents flow through the power transmission coil 11 and the first and second filter coils 13 and 14. More specifically, the directions of the currents (11*i* and 13*i*) in FIG. 2(*b*) correspond to the winding directions of the power transmission coil 11 and the first and second filter coils 13 and 14. The winding direction of the power transmission coil 11 is opposite to the winding direction of the filter coils (13 and 14). Therefore, when reversed-phase alternating currents flow through the coils, magnetic fluxes (11G and 13G) are generated, which are directed in opposite directions on the Z-axis.

Figure 3:
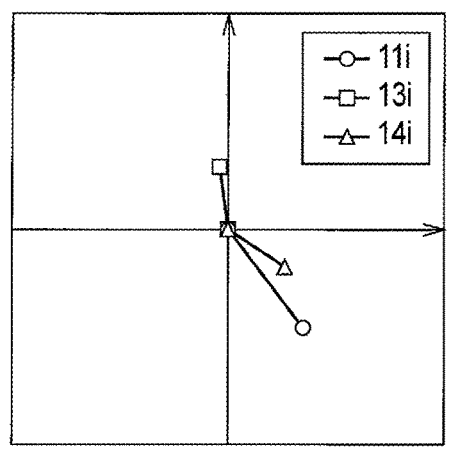
FIG. 3(a) is a vector diagram showing phase relationships between currents flowing through the power transmission coil 11 and the first and second filter coils 13 and 14.
FIG. 3(b) is a cross-sectional view showing how the magnetic flux generated by the first filter coil 13 cancels out the magnetic flux generated by the power transmission coil 11 in the magnetic material plate 12.
FIGS. 3(c) and 3(d) are diagrams showing a difference in amount of heat generation in the magnetic material plate 12, depending on the presence or absence of the first filter coil 13.
Figure 3:
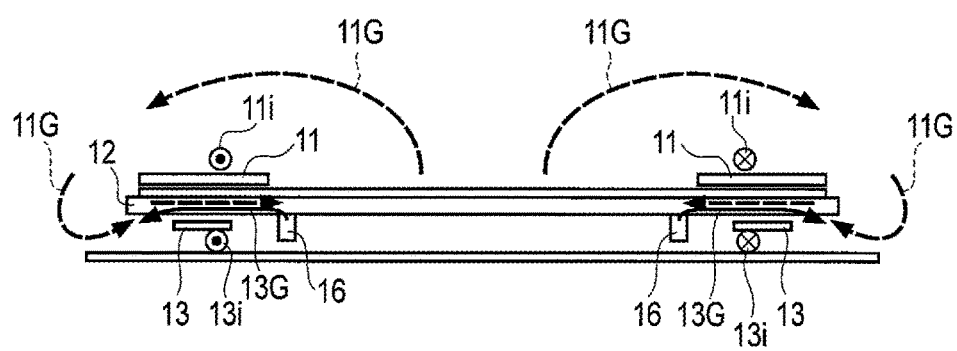
Figure 3:
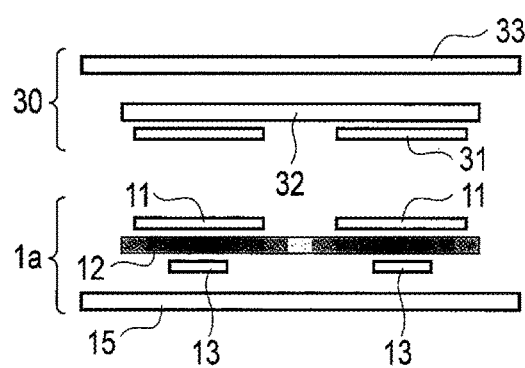
Figure 3:
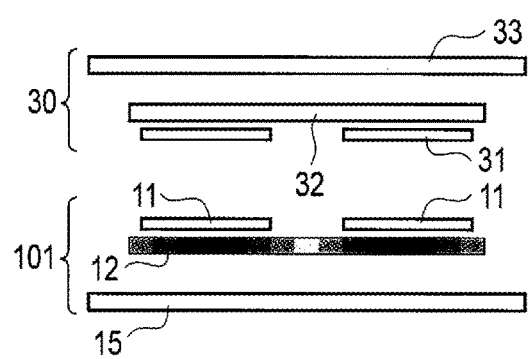

FIG. 3(*a*) is a vector diagram showing phase relationships between the currents flowing through the power transmission coil 11 and the first and second filter coils 13 and 14 shown in FIG. 2. The phase of the alternating current 13*i* flowing through the first filter coil 13 is shifted by about 180 degrees from the phase of the alternating current 11*i* flowing through the power transmission coil 11, and thus the both are in an opposite-phase relationship. Therefore, any one of the currents 11*i* and 13*i* in FIG. 2(*b*) is reversed. Accordingly, when reversed-phase alternating currents flow through the coils, magnetic fluxes (11G and 13G) are generated, which are directed in the same direction on the Z-axis.

FIG. 3(*b*) shows how the magnetic flux generated by the first filter coil 13 cancels out the magnetic flux generated by the power transmission coil 11 in the magnetic material plate 12. Although the winding directions of the power transmission coil 11 and the first filter coil 13 are opposite to each other, reversed-phase alternating currents flow through the power transmission coil 11 and the first filter coil 13. Therefore, as shown in FIG. 3(*b*), the power transmission coil 11 and the first filter coil 13 generate the magnetic fluxes (11G and 13G) in the same direction, with the currents (11*i* and 13*i*) simultaneously flowing in the same direction.

As described above, in the first embodiment, when seen from the direction (Z-axis direction) of the magnetic flux passing through the power transmission coil 11, the winding width centers 13*c* of at least two of the sides of the first filter coil 13 correspond to the winding width center 11*c* of the power transmission coil 11. Thus, since the magnetic fluxes 11G and 13G are directed in opposite directions in the magnetic material plate 12 adjacent to the power transmission coil 11, the magnetic fluxes cancel out each other. In other words, the first filter coil 13 is disposed in a position where the magnetic flux 13G generated by the first filter coil 13 cancels out the magnetic flux 11G generated by the power transmission coil 11 in the magnetic material plate 12. Therefore, iron loss and heat generation can be suppressed in the magnetic material plate 12 by reducing the magnetic flux density increased in the magnetic material plate 12 adjacent to the power transmission coil 11.

FIGS. 3(*c*) and 3(*d*) are diagrams showing a difference in amount of heat generation in the magnetic material plate 12, depending on the presence or absence of the first filter coil 13. The internal temperature of the magnetic material plate 12 adjacent to the power transmission coil 11 is higher than the surrounding temperature. The inventors and the like have confirmed by experiment or simulation that the temperature of the magnetic material plate 12 adjacent to the power transmission coil 11 is lower in the first embodiment shown in FIG. 3(*c*) with the first filter coil 13 than in a comparative example shown in FIG. 3(*d*) without the first filter coil 13. Note that FIGS. 3(*c*) and 3(*d*) show the state where a vehicle-side coil unit 30 including a power reception coil 31, a magnetic material plate 32, and a base plate 33 is disposed above the ground-side coil unit 1*a* at a distance therefrom.

Modified Example

Figure 4:
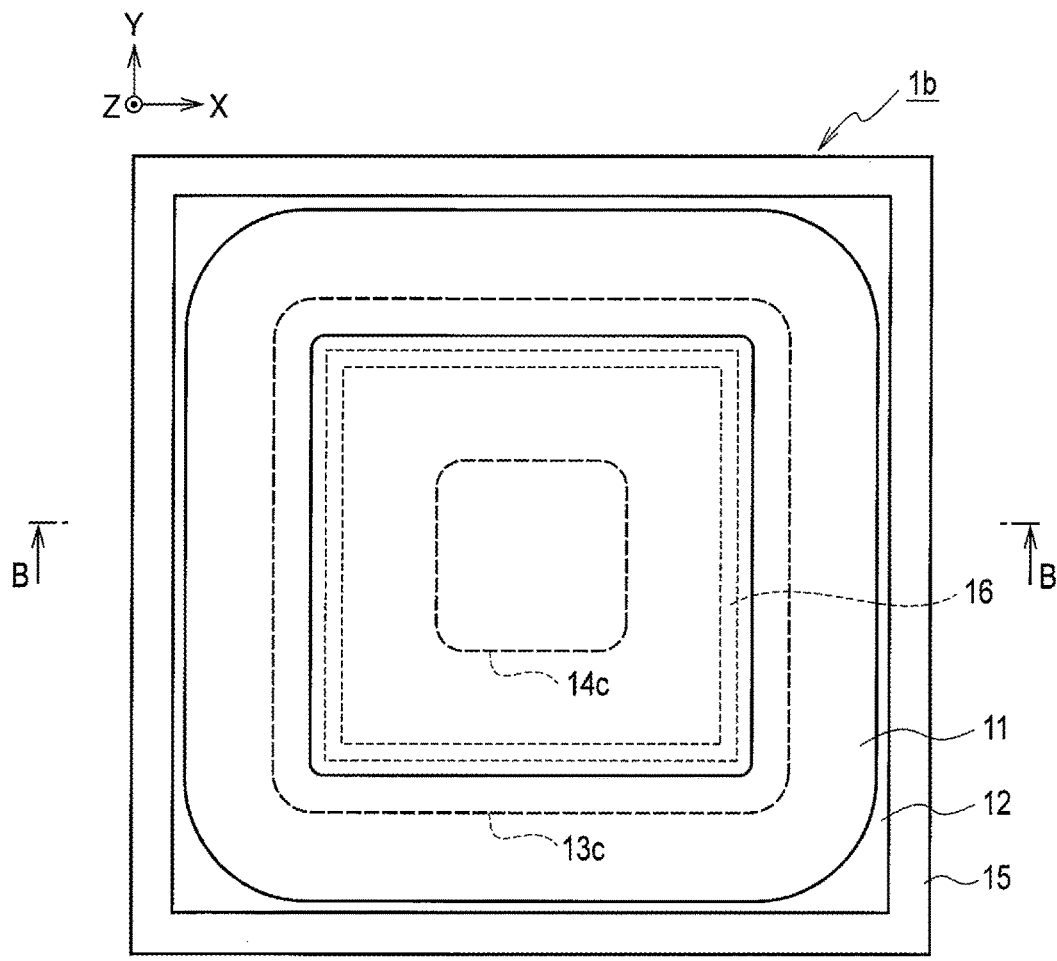
FIG. 4(a) is a top view showing a configuration of a ground-side coil unit 1b according to a modified example of the first embodiment.
FIG. 4(b) is a cross-sectional view taken along the line B-B in FIG. 4(a).
Figure 4:
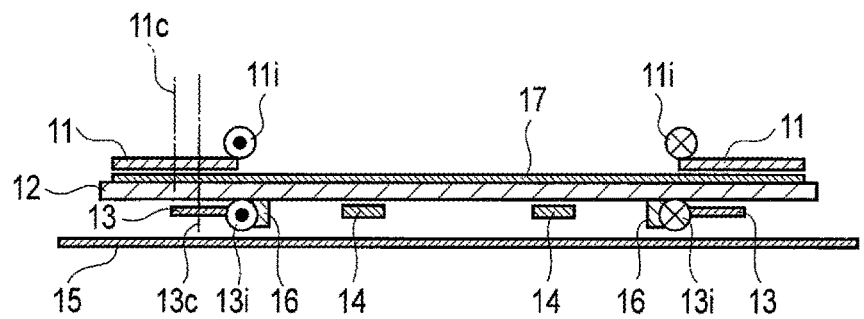

FIG. 4(*a*) shows a configuration of a ground-side coil unit 1*b* according to a modified example of the first embodiment. The ground-side coil unit 1*b* according to the modified example is different from the ground-side coil unit 1*a* in the following point. When seen from the direction (Z-axis direction) of the magnetic flux (11G) passing through the power transmission coil 11, the winding width centers 13*c* of at least two of the sides of the first filter coil 13 are positioned between the winding width center lie of the power transmission coil 11 and the inner circumferential edge of the power transmission coil 11.

More specifically, when seen from the Z-axis direction, the winding width centers 13*c* of at least two of the sides of the first filter coil 13 do not have to correspond to the winding width center 11*c* of the power transmission coil 11. Even when the winding width center 13*c* is shifted closer to the coil center than the winding width center 11*c*, the magnetic flux 13G can cancel out the magnetic flux 11G in the magnetic material plate 12.

As described above, the first embodiment can achieve the following advantageous effects.

The first filter coil 13 is disposed in a position where the magnetic flux 13G generated by the first filter coil 13 cancels out the magnetic flux 11G generated by the power transmission coil 11 in the magnetic material plate 12. Therefore, iron loss and heat generation can be suppressed in the magnetic material plate 12 by reducing the magnetic flux density increased in the magnetic material plate 12 adjacent to the power transmission coil 11.

The efficient use of the space between the magnetic material plate 12 and the base plate 15 can realize the two-stage filter circuit configuration, contributing to reduction in size of the ground-side coil unit.

As shown in FIG. 3(*a*), reversed-phase alternating currents (11*i* and 13*i*) flow through the power transmission coil 11 and the first filter coil 13. Also, as shown in FIG. 2(*b*), the winding directions of the power transmission coil 11 and the first filter coil 13 are opposite to each other. Therefore, as shown in FIG. 3(*b*), the currents (11*i* and 13*i*) flow so that the magnetic fluxes (11G and 13G) generated by the power transmission coil 11 and the first filter coil 13 are simultaneously directed in the same direction. Thus, the magnetic flux 13G generated by the first filter coil 13 can cancel out the magnetic flux 11G generated by the power transmission coil 11 in the magnetic material plate 12.

As a matter of course, the alternating currents (11*i* and 13*i*) may be in phase with each other and have the same winding direction. More specifically, the in-phase alternating currents (11*i* and 13*i*) may flow through the power transmission coil 11 and the first filter coil 13, and the power transmission coil 11 and the first filter coil 13 may have the same winding direction. Therefore, the currents (11*i* and 13*i*) flow so that the magnetic fluxes (11G and 13G) generated by the power transmission coil 11 and the first filter coil 13 are simultaneously directed in the same direction. Thus, magnetic flux 13G generated by the first filter coil 13 can cancel out the magnetic flux 11G generated by the power transmission coil 11 in the magnetic material plate 12.

When seen from the direction of the magnetic flux passing through the power transmission coil 11, the winding width centers 13c of at least two of the sides of the first filter coil 13 correspond to the winding width center 11c of the power transmission coil 11. Thus, the magnetic flux can be canceled out in the magnetic material plate 12 in a region where the winding width centers of the first filter coil 13 and the power transmission coil 11 correspond to each other.

When seen from the direction of the magnetic flux passing through the power transmission coil 11, the winding width centers 13c of at least two of the sides of the first filter coil 13 are positioned between the winding width center 11c of the power transmission coil 11 and the inner circumferential edge thereof. Thus, the magnetic flux can be canceled out in the magnetic material plate 12 in a region where the winding width center 13c of the first filter coil 13 is positioned between the winding width center 11c of the power transmission coil 11 and the inner circumferential edge thereof.

The magnetic material wall 16 separates the first filter coil 13 from the second filter coil 14. Thus, a magnetic coupling coefficient of the first and second filter coils 13 and 14 can be reduced by magnetically blocking between the first and second filter coils 13 and 14.

Second Embodiment

First, with reference to FIGS. 5(a) and 5(b), description is given of a configuration of a ground-side coil unit 2 according to a second embodiment. A first filter coil 13 includes a first upper coil 13a and a first lower coil 13b. The first upper coil 13a and the first lower coil 13b are disposed so as to be magnetically coupled to each other. To be more specific, the first upper coil 13a and the first lower coil 13b are stacked in the Z-axis direction. When seen from the Z-axis direction, the first upper coil 13a and the first lower coil 13b have the same shape and are disposed in the same position. The first upper coil 13a and the first lower coil 13b can be magnetically coupled to each other.

A second filter coil 14 includes a second upper coil 14a and a second lower coil 14b. The second upper coil 14a and the second lower coil 14b are disposed so as to be magnetically coupled to each other. To be more specific, when seen from the Z-axis direction, the second upper coil 14a and the second lower coil 14b have the same shape and are stacked in the Z-axis direction.

The other configuration is the same as that shown in FIGS. 1(a) and 1(b), and thus description thereof is omitted.

Figure 5:
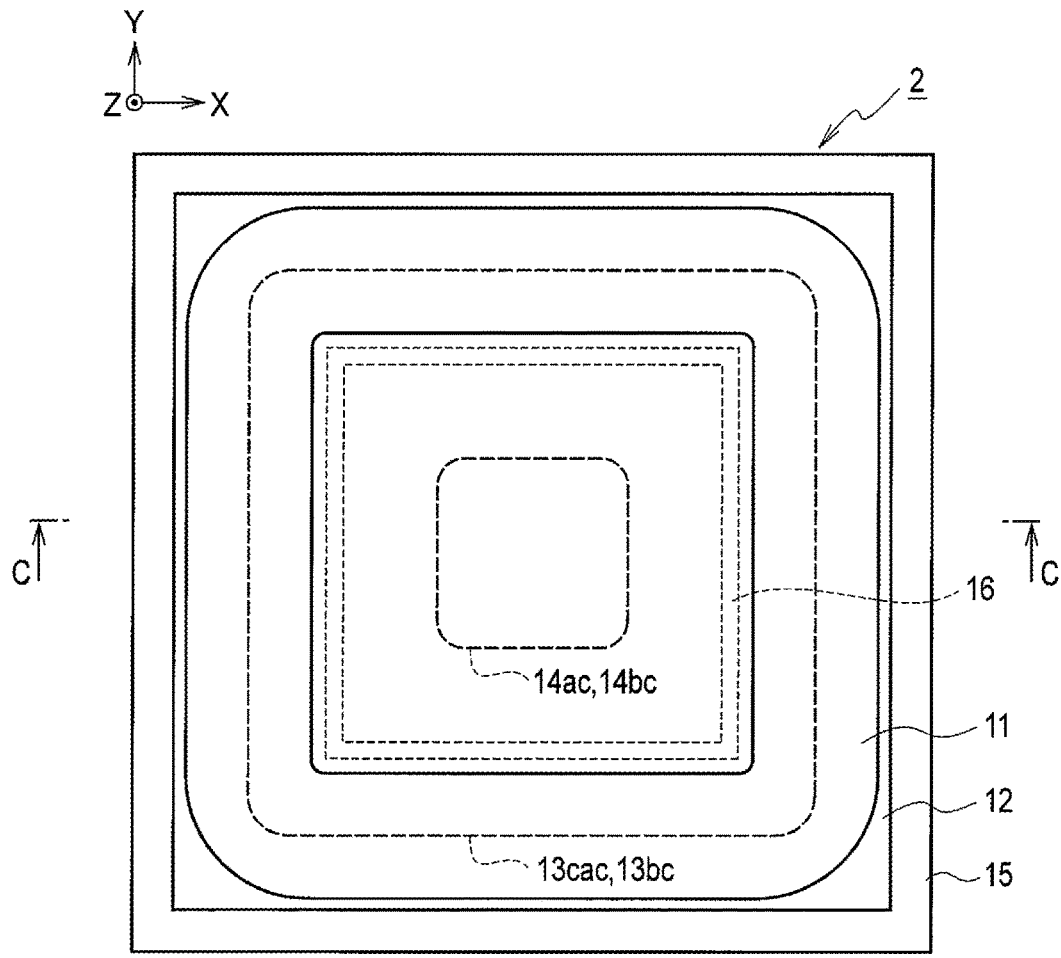
FIG. 5(a) is a top view showing a configuration of a ground-side coil unit 2 according to a second embodiment.
FIG. 5(b) is a cross-sectional view taken along the line C-C in FIG. 5(a).
Figure 5:
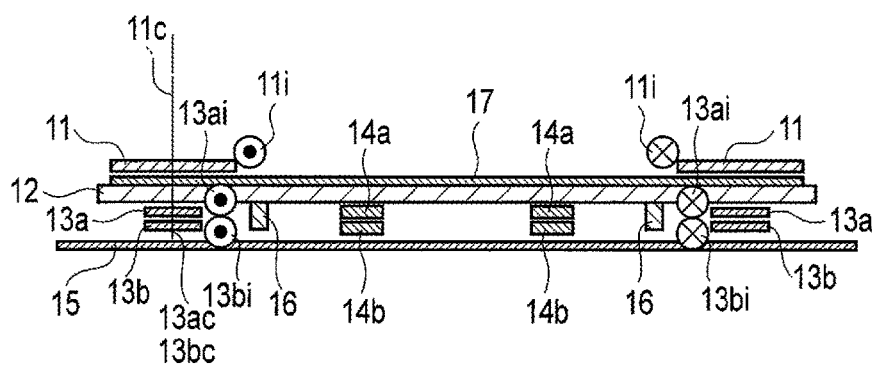
Figure 6:
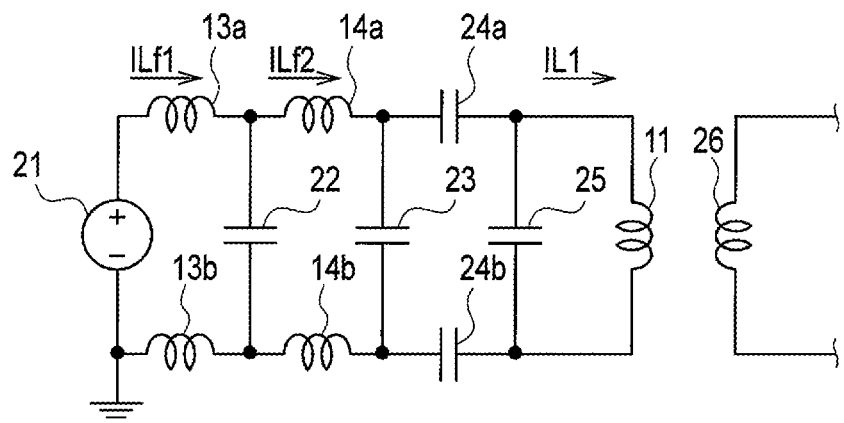
FIG. 6(a) is a circuit diagram showing a configuration of a ground-side circuit corresponding to the ground-side coil unit 2 shown in FIG. 5.
FIG. 6(b) is a perspective view showing winding directions of a power transmission coil 11, a first upper coil 13a, a first lower coil 13b, a second upper coil 14a, and a second lower coil 14b shown in FIG. 6(a).
Figure 6:
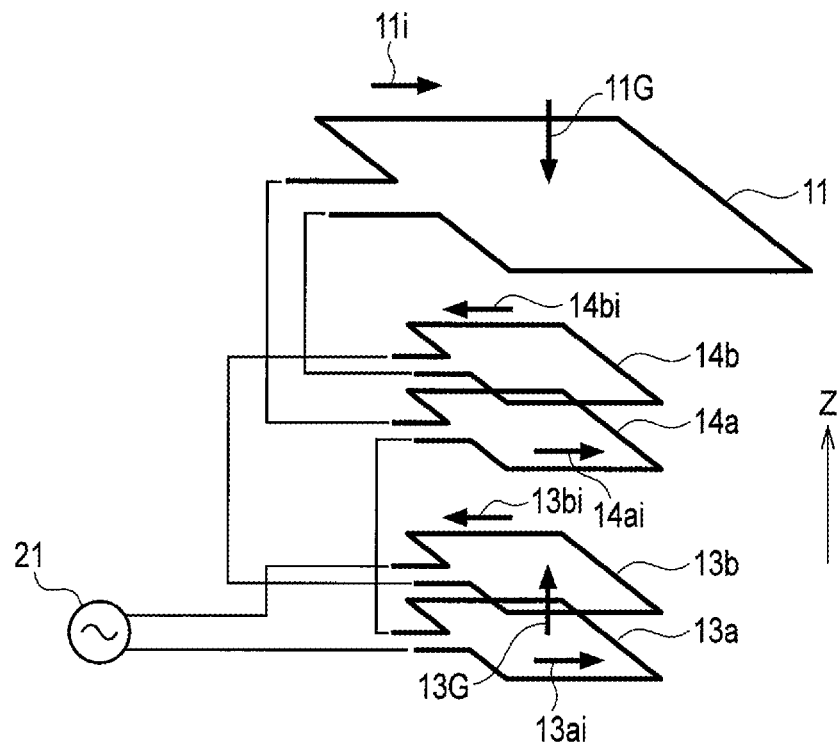

With reference to FIGS. 6(a) and 6(b), description is given of winding directions of the power transmission coil 11, the first upper coil 13a, the first lower coil 13b, the second upper coil 14a, and the second lower coil 14b shown in FIG. 5. FIG. 6(a) is a circuit diagram showing a configuration of a ground-side circuit corresponding to the ground-side coil unit 2 shown in FIG. 5.

A filter circuit 27 is different from that shown in FIG. 2(a) in the following point. The first upper coil 13a is connected to one output terminal of an inverter 21, while the first lower coil 13b is connected to the other output terminal of the inverter 21. The second upper coil 14a is connected in series with the other end of the first upper coil 13a, while the second lower coil 14b is connected in series with the other end of the first lower coil 13b.

A ground resonance circuit 28 is different from that shown in FIG. 2(a) in the following point. The ground resonance circuit 28 further includes a capacitor 24b to be paired with a capacitor 24a. The capacitors 24a and 24b are connected directly to the both ends of the power transmission coil 11 and the capacitor 25, which are connected in parallel.

The other configuration is the same as that shown in FIG. 2(a), and thus description thereof is omitted. As described above, the first upper coil 13a and the second upper coil 14a are connected in series with one terminal of the power transmission coil 11. Meanwhile, the first lower coil 13b and the second lower coil 14b are connected in series with the other terminal of the power transmission coil 11.

The second upper coil 14a and the second lower coil 14b are connected closer to the power transmission coil 11 than the first upper coil 13a and the first lower coil 13b. The first upper coil 13a and the first lower coil 13b are connected closer to the inverter 21 than the second upper coil 14a and the second lower coil 14b.

FIG. 6(b) is a perspective view showing the winding directions of the power transmission coil 11, the first upper coil 13a, the first lower coil 13b, the second upper coil 14a, and the second lower coil 14b shown in FIG. 6(a). The directions of currents (11i, 13ai, 13bi, 14ai, and 14bi) in FIG. 6(b) represent a case where in-phase alternating currents flow through the power transmission coil 11, the first upper coil 13a, the first lower coil 13b, the second upper coil 14a, and the second lower coil 14b. More specifically, the directions of the currents (11i, 13ai, 13bi, 14ai, and 14bi) in FIG. 6(b) correspond to the winding directions of the power transmission coil 11, the first upper coil 13a, the first lower coil 13b, the second upper coil 14a, and the second lower coil 14b. The winding direction of the power transmission coil 11 is opposite to the winding directions of all the filter coils (13a, 13b, 14a, and 14b). Therefore, when in-phase alternating currents flow through the coils, magnetic fluxes (11G and 13G) are generated, which are directed in opposite directions on the Z-axis. Note that the winding direction of all the filter coils (13a, 13b, 14a, and 14b) are the same.

Next, description is given of phase relationships between the currents flowing through the power transmission coil 11, the first upper coil 13a, the first lower coil 13b, the second upper coil 14a, and the second lower coil 14b. The alternating current flowing through the first upper coil 13a is in phase with the alternating current flowing through the first lower coil 13b. The alternating current flowing through the second upper coil 14a is in phase with the alternating current flowing through the second lower coil 14b. The phase relationships between the currents flowing through the power transmission coil 11, the first filter coil 13, and the second filter coil 14 are the same as those shown in the vector diagram of FIG. 3(a). Therefore, the phase of the alternating currents (13ai and 13bi) flowing through the first upper coil 13a and the first lower coil 13b is shifted by about 180 degrees from the phase of the alternating current 11i flowing through the power transmission coil 11, and thus the both are in an opposite-phase relationship. Therefore, the direction of any one of the current 11i and the currents (13ai and 13bi) in FIG. 6(b) is reversed. Accordingly, when reversed-phase alternating currents flow through the coils, magnetic fluxes (11G and 13G) are generated, which are directed in the same direction on the Z-axis.

Therefore, as shown in FIG. 5(b), the power transmission coil 11, the first upper coil 13a, and the first lower coil 13b generate the magnetic fluxes (11G and 13G) in the same direction, with the currents (11i, 13ai, and 13bi) simultaneously flowing in the same direction. Thus, the magnetic flux generated by the first upper coil 13a and the first lower coil 13b can cancel out the magnetic flux generated by the power transmission coil 11 in the magnetic material plate 12.

As described above, in the second embodiment, when seen from the direction (Z-axis direction) of the magnetic flux passing through the power transmission coil 11, the winding width centers (13ac and 13bc) of at least two of the sides of the first upper coil 13a and the first lower coil 13b correspond to the winding width center 11c of the power transmission coil 11. Thus, since the magnetic fluxes 11G and 13G are directed in opposite directions in the magnetic material plate 12 adjacent to the power transmission coil 11, the magnetic fluxes cancel out each other. In other words, the first upper coil 13a and the first lower coil 13b are disposed in positions where the magnetic flux 13G generated by the first upper coil 13a and the first lower coil 13b cancels out the magnetic flux 11G generated by the power transmission coil 11 in the magnetic material plate 12. Therefore, iron loss and heat generation can be suppressed in the magnetic material plate 12 by reducing the magnetic flux density increased in the magnetic material plate 12 adjacent to the power transmission coil 11.

As described above, the second embodiment can further achieve the following advantageous effects in addition to the advantageous effects achieved by the first embodiment.

The first upper coil 13a is magnetically coupled to the first lower coil 13b. This increases the inductance of the first filter coil 13, thus enabling the coil unit to be reduced in size. Moreover, dividing the first filter coil 13 into upper and lower parts reduces noise.

Third Embodiment

First, with reference to FIGS. 7(a) and 7(b), description is given of a configuration of a ground-side coil unit 3 according to a third embodiment. A first filter coil 13 includes a first upper coil 13a and a first lower coil 13b. When seen from the Z-axis direction, the first upper coil 13a and the first lower coil 13b have the same rectangular shape, but are disposed in different positions. The first upper coil 13a and the first lower coil 13b are arranged in parallel in a short-side direction of a parking space where the ground-side coil unit 3 is provided, that is, a parking space width direction (Y-axis direction). The winding width center 13ac of the first upper coil 13a corresponds to the winding width center 11c of the power transmission coil 11 on the two short sides and one long side. The winding width center 13bc of the first lower coil 13b also corresponds to the winding width center 11e of the power transmission coil 11 on the two short sides and one long side.

A second filter coil 14 includes a second upper coil 14a and a second lower coil 14b. When seen from the Z-axis direction, the second upper coil 14a and the second lower coil 14b have the same shape and are disposed in the same position, that is, stacked in the Z-axis direction. Furthermore, when seen from the Z-axis direction, the second upper coil 14a and the second lower coil 14b are disposed between the first upper coil 13a and the first lower coil 13b.

Magnetic material walls 16 are disposed on the inside of the first upper coil 13a and on the inside of the second upper coil 14a. Furthermore, the magnetic material walls 16 are also disposed between the first upper coil 13a and the second filter coil (14a and 14b) and between the first lower coil 13b and the second filter coil (14a and 14b).

Figure 7:
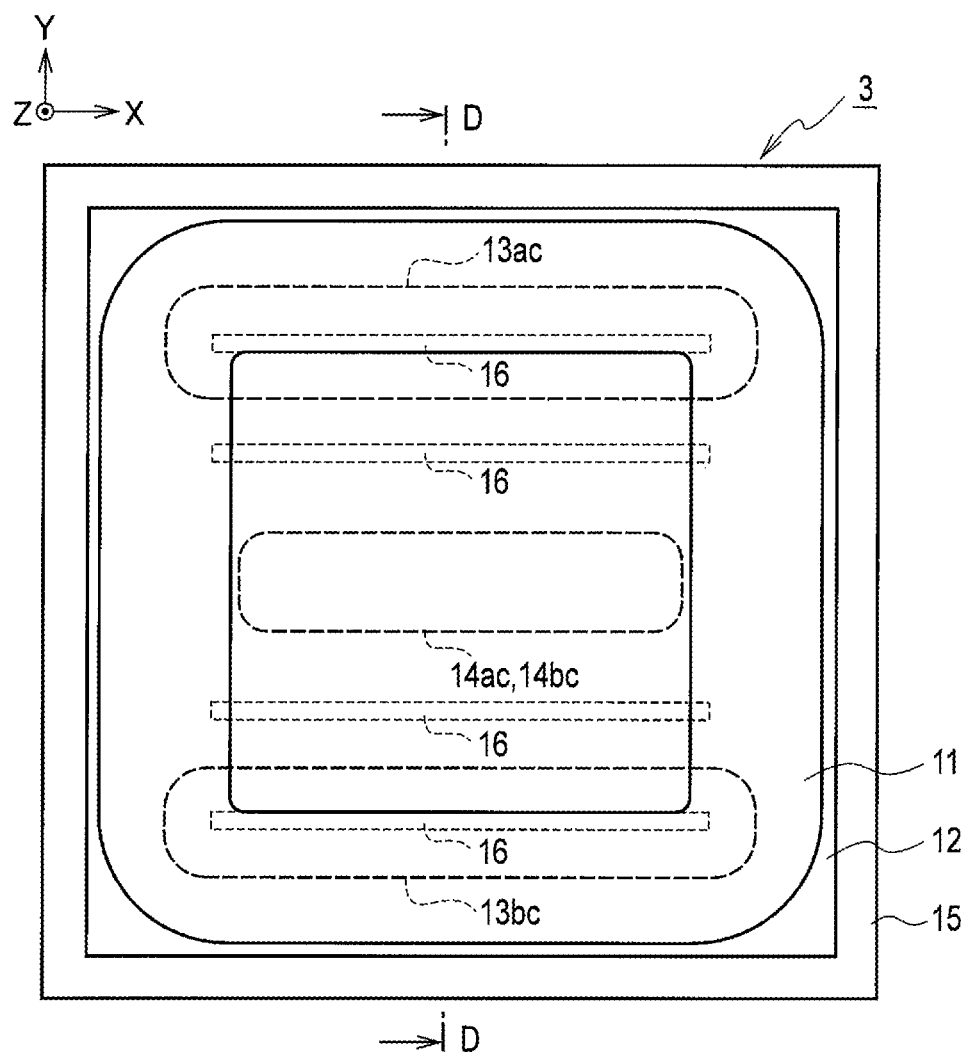
FIG. 7(a) is a top view showing a configuration of a ground-side coil unit 3 according to a third embodiment.
FIG. 7(b) is a cross-sectional view taken along the line D-D in FIG. 7(a).
Figure 7:
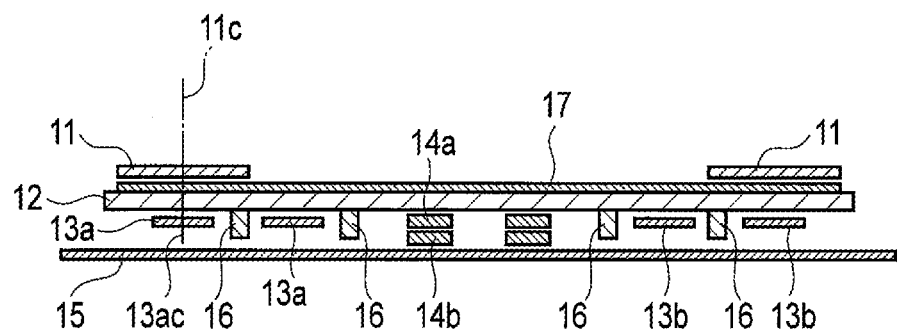

A ground-side circuit corresponding to the ground-side coil unit 3 shown in FIG. 7 is the same as that shown in FIG. 6(a). The winding directions of the power transmission coil 11, the first upper coil 13a, the first lower coil 13b, the second upper coil 14a, and the second lower coil 14b are the same as those shown in FIG. 6(b). Moreover, phase relationships between the alternating currents flowing through the coils (11, 13a, 13b, 14a, and 14b) are also the same as those in the second embodiment.

Figure 8:
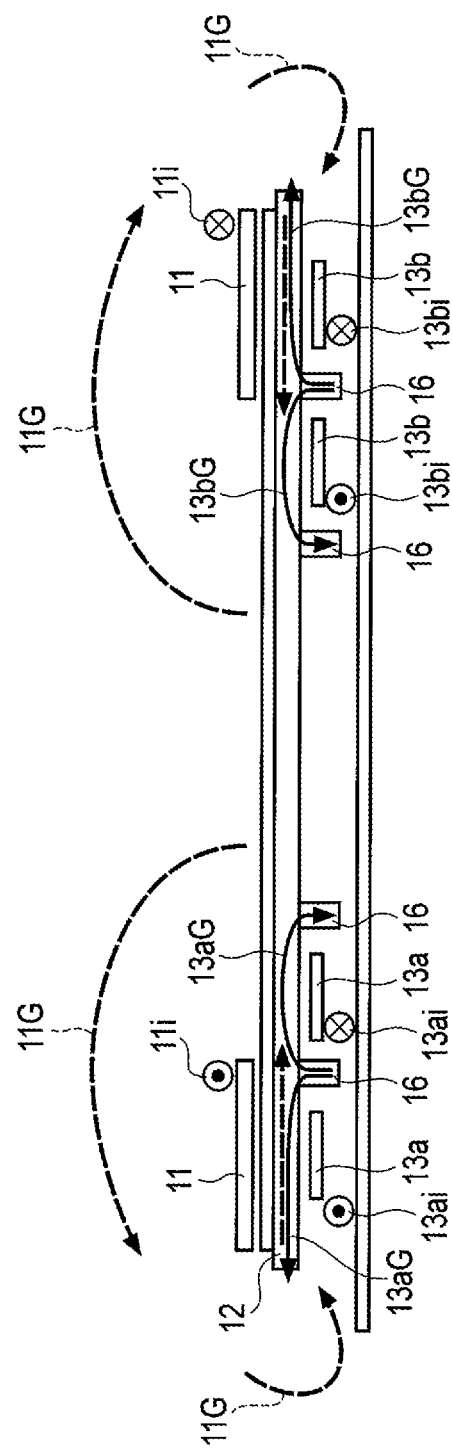
FIG. 8 is a cross-sectional view showing how magnetic fluxes (13aG and 13bG) generated by the first upper coil 13a and the first lower coil 13b cancel out the magnetic flux 11G generated by the power transmission coil 11 in the magnetic material plate 12.

FIG. 8 shows how the magnetic flux generated by the first upper coil 13a and the first lower coil 13b cancels out the magnetic flux generated by the power transmission coil 11 in the magnetic material plate 12. As shown in FIG. 8, the power transmission coil 11, the first upper coil 13a, and the first lower coil 13b generate magnetic fluxes (11G, 13aG, and 13bG) in the same direction, with the currents (11i, 13ai, and 13bi) simultaneously flowing in the same direction. The magnetic fluxes (13aG and 13bG) pass through the magnetic material walls 16 on the inside and outside of the coils (13a and 13b).

Since the magnetic flux 11G and the magnetic fluxes (13aG and 13bG) are directed in opposite directions in the magnetic material plate 12 adjacent to the power transmission coil 11, the magnetic fluxes cancel out each other. In other words, the first upper coil 13a and the first lower coil 13b are disposed in positions where the magnetic fluxes (13aG and 13bG) generated by the first upper coil 13a and the first lower coil 13b cancel out the magnetic flux 11G generated by the power transmission coil 11 in the magnetic material plate 12. Therefore, iron loss and heat generation can be suppressed in the magnetic material plate 12 by reducing the magnetic flux density increased in the magnetic material plate 12 adjacent to the power transmission coil 11.

As described above, in the third embodiment, the first upper coil 13a and the first lower coil 13b are arranged in parallel in the short-side direction (Y-axis direction) of the parking space where the ground-side coil unit 3 is provided. Thus, the first upper coil 13a and the first lower coil 13b can be disposed in a portion of a rectangular power reception coil 26 where the magnetic flux density is increased, the power reception coil having long sides extending in a vehicle width direction.

Fourth Embodiment

Figure 9:
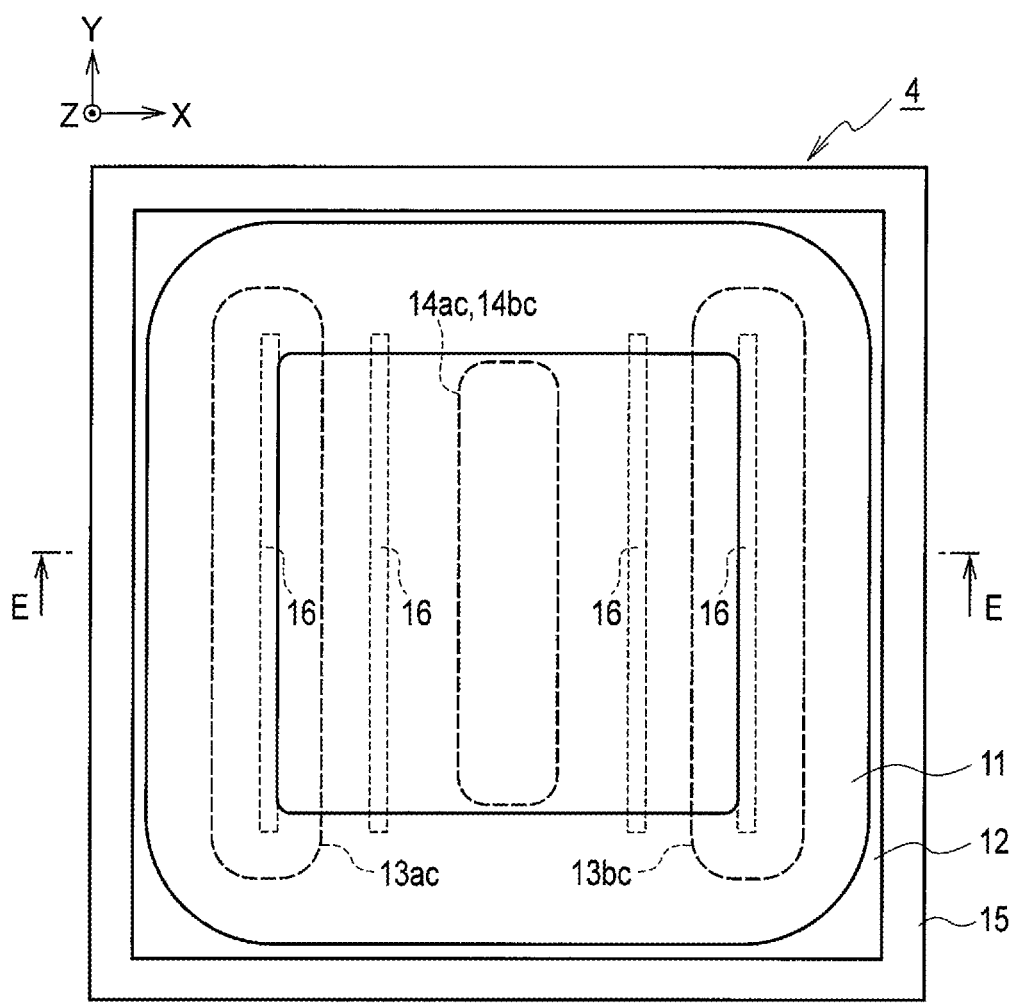
FIG. 9 is a top view showing a configuration of a ground-side coil unit 4 according to a fourth embodiment.

As shown in FIG. 9, in a ground-side coil unit 4 according to a fourth embodiment, the direction of arranging a first upper coil 13a and a first lower coil 13b in parallel is set to the long-side direction of the parking space, that is, a vehicle traveling direction (X-axis direction). The other configuration is the same as that of the third embodiment.

According to the fourth embodiment, the first upper coil 13a and the first lower coil 13b are arranged in parallel in the long-side direction (X-axis direction) of the parking space where the ground-side coil unit 4 is provided. Thus, the first upper coil 13a and the first lower coil 13b can be disposed in a portion of a rectangular power reception coil 26 where the magnetic flux density is increased, the power reception coil having long sides extending in the vehicle traveling direction.

Fifth Embodiment

Figure 10:
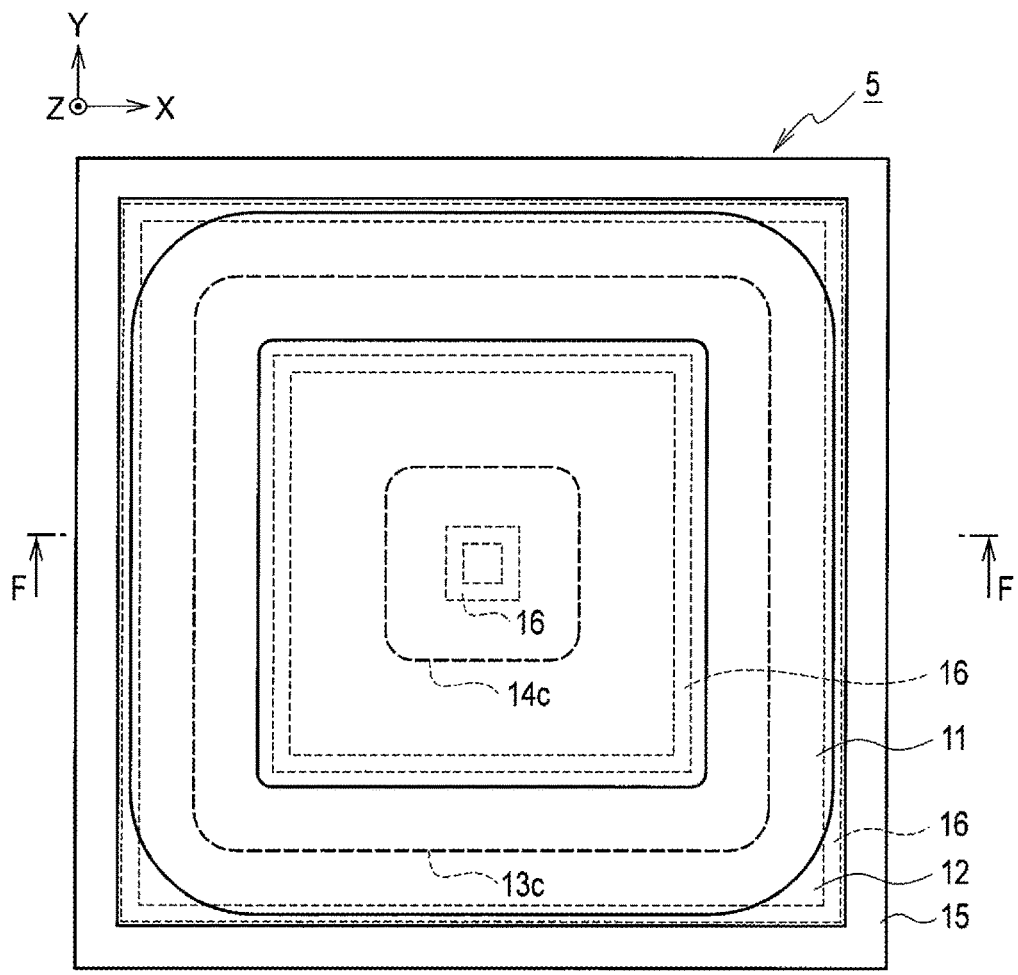
FIG. 10(a) is a top view showing a configuration of a ground-side coil unit 5 according to a fifth embodiment.
FIG. 10(b) is a cross-sectional view taken along the line F-F in FIG. 10(a).
Figure 10:
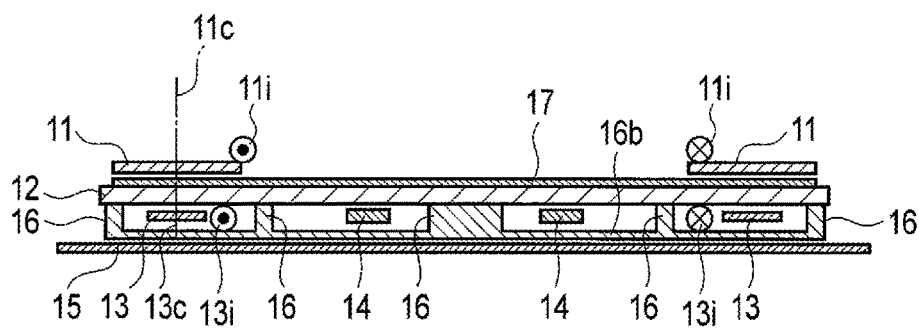

With reference to FIGS. 10(a) and 10(b), description is given of a configuration of a ground-side coil unit 5 according to a fifth embodiment. The ground-side coil unit 5 according to the fifth embodiment further includes magnetic material walls 16 on the inside of the second filter coil 14 and on the outside of the first filter coil 13, compared with the ground-side coil unit 1a shown in FIG. 1. The respective magnetic material walls 16 are supported by a plate-like magnetic material base 16b disposed between the magnetic material walls 16 and the base plate 15. Thus, as shown in FIG. 10(b), the first filter coil 13 and the second filter coil 14 are surrounded by the magnetic material plate 12, the magnetic material walls 16, and the magnetic material base 16b. The other configuration is the same as that of the ground-side coil unit 1a shown in FIG. 1.

Thus, many magnetic fluxes generated by the first filter coil 13 and the second filter coil 14 flow through the magnetic material plate 12, the magnetic material walls 16, and the magnetic material base 16b. Therefore, the magnetic coupling coefficient of the first and second filter coils 13 and 14 can be further reduced by magnetically blocking between the first and second filter coils 13 and 14.

Sixth Embodiment

With reference to FIGS. 11(a) and 11(b), description is given of a configuration of a ground-side coil unit 6 according to a sixth embodiment. A first filter coil 13 includes a first upper coil 13a and a first lower coil 13b. When seen from the Z-axis direction, the first upper coil 13a and the first lower coil 13b have the same rectangular shape, but are disposed in different positions. The first upper coil 13a and the first lower coil 13b are arranged in parallel in a short-side direction of a parking space where the ground-side coil unit 6 is provided, that is, a parking space width direction (Y-axis direction). When seen from the Z-axis direction, the first upper coil 13a does not overlap with the first lower coil 13b. The winding width center 13ac of the first upper coil 13a corresponds to the winding width center 11c of the power transmission coil 11 on the two short sides and one long side. The winding width center 13bc of the first lower coil 13b also corresponds to the winding width center 11c of the power transmission coil 11 on the two short sides and one long side.

A second filter coil 14 includes a second upper coil 14a and a second lower coil 14b. When seen from the Z-axis direction, the second upper coil 14a and the second lower coil 14b have the same rectangular shape, but are disposed in different positions. To be more specific, the second upper coil 14a and the second lower coil 14b are disposed such that a part of the second upper coil 14a and a part of the second lower coil 14b overlap with each other.

When seen from the Z-axis direction, a half of the area of the first upper coil 13a overlaps with the second upper coil 14a. Also, a half of the area of the first lower coil 13b overlaps with the second lower coil 14b. The first upper coil 13a does not overlap with the second lower coil 14b, and the first lower coil 13b does not overlap with the second upper coil 14a. The ground-side coil unit 6 includes no magnetic material walls.

Figure 11:
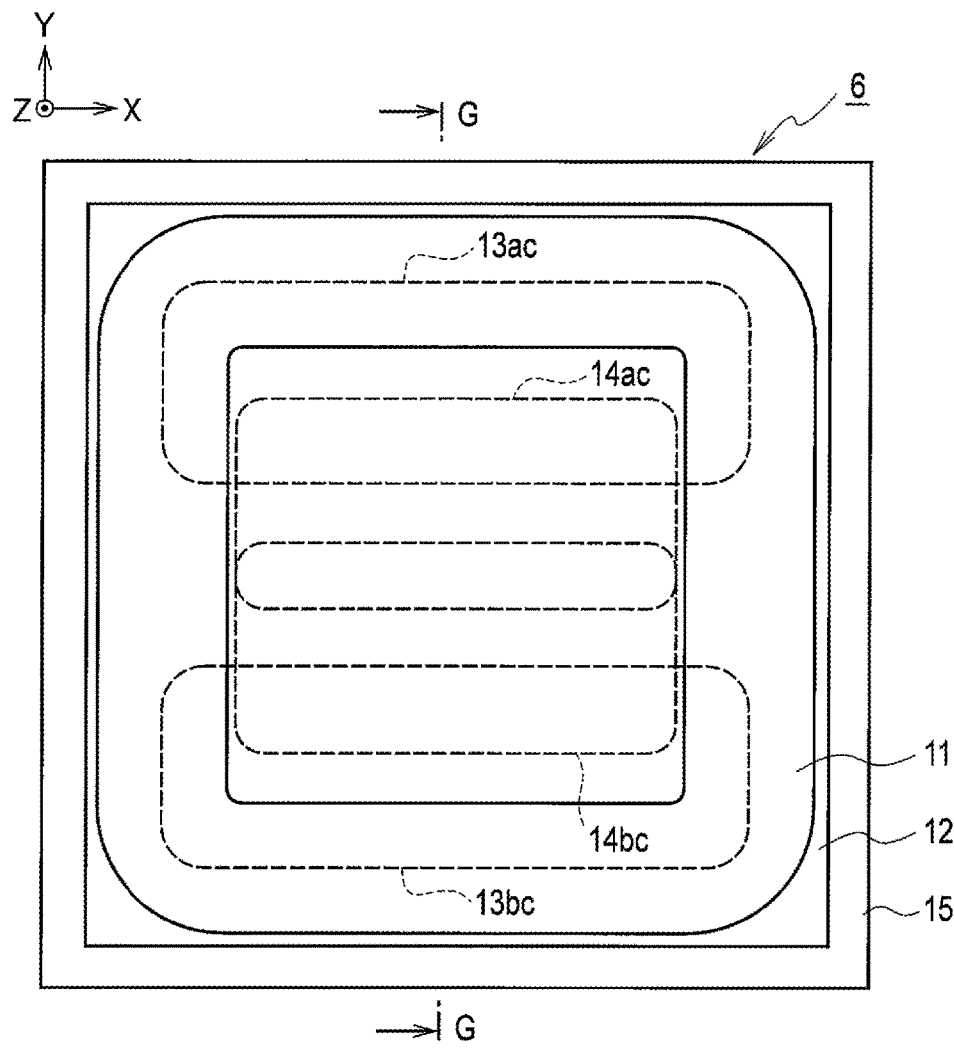
FIG. 11(a) is a top view showing a configuration of a ground-side coil unit 6 according to a sixth embodiment.
FIG. 11(b) is a cross-sectional view taken along the line G-G in FIG. 11(a).
Figure 11:
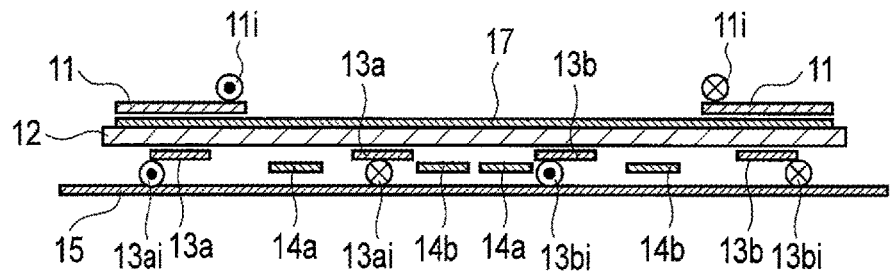

A ground-side circuit corresponding to the ground-side coil unit 6 shown in FIG. 11 is the same as that shown in FIG. 6(a). The winding directions of the power transmission coil 11, the first upper coil 13a, the first lower coil 13b, the second upper coil 14a, and the second lower coil 14b are the same as those shown in FIG. 6(b). Moreover, phase relationships between the alternating currents flowing through the coils (11, 13a, 13b, 14a, and 14b) are also the same as those in the second embodiment.

Therefore, as shown in FIG. 11, the power transmission coil 11, the first upper coil 13a, and the first lower coil 13b generate magnetic fluxes in the same direction, with the currents (11i, 13ai, and 13bi) simultaneously flowing in the same direction.

As described with reference to FIG. 8, the first upper coil 13a and the first lower coil 13b are disposed in positions where the magnetic fluxes (13aG and 13bG) generated by the first upper coil 13a and the first lower coil 13b cancel out the magnetic flux 11G generated by the power transmission coil 11 in the magnetic material plate 12. Therefore, iron loss and heat generation can be suppressed in the magnetic material plate 12 by reducing the magnetic flux density increased in the magnetic material plate 12 adjacent to the power transmission coil 11.

As described above, when seen from the Z-axis direction, a half of the area of the first upper coil 13a overlaps with the second upper coil 14a. Also, a half of the area of the first lower coil 13b overlaps with the second lower coil 14b. More specifically, when seen from the direction of the magnetic flux passing through the power transmission coil 11, a half of the area of the first filter coil (13a and 13b) overlaps with the second filter coil (14a and 14b). Thus, the magnetic coupling coefficient of the first filter coil (13a and 13b) and the second filter coil (14a and 14b) can be reduced.

Seventh Embodiment

Figure 12:
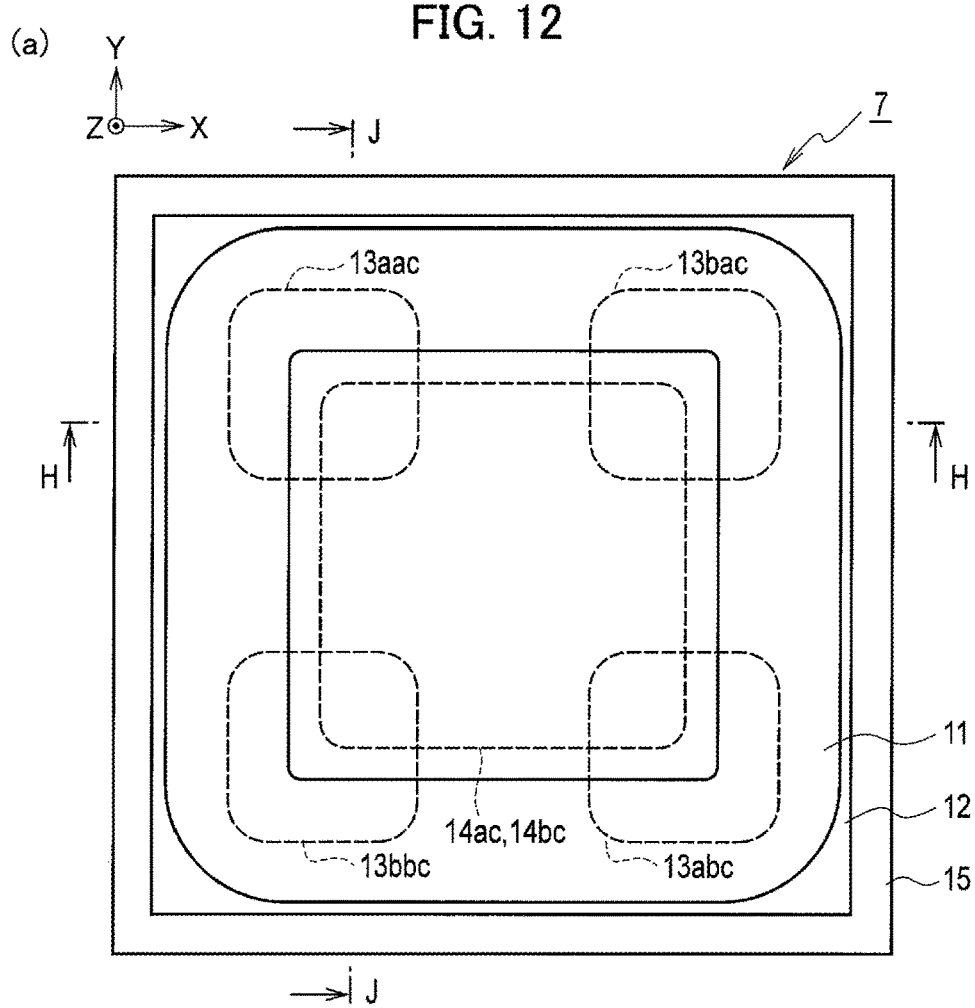
FIG. 12(a) is a top view showing a configuration of a ground-side coil unit 7 according to a seventh embodiment.
FIG. 12(b) is a cross-sectional view taken along the line H-H in FIG. 12(a)
FIG. 12(c) is a cross-sectional view taken along the line J-J in FIG. 12(a).
Figure 12:
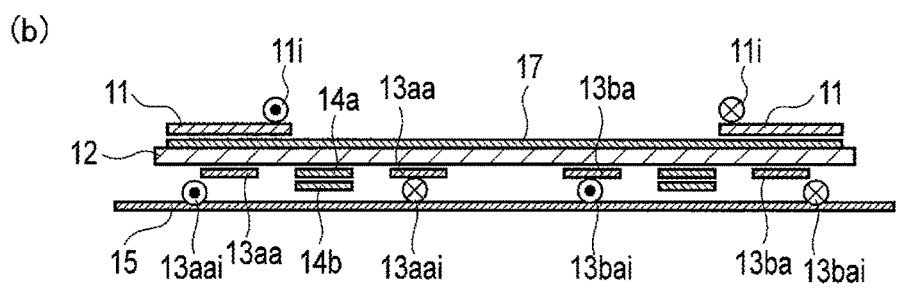
Figure 12:
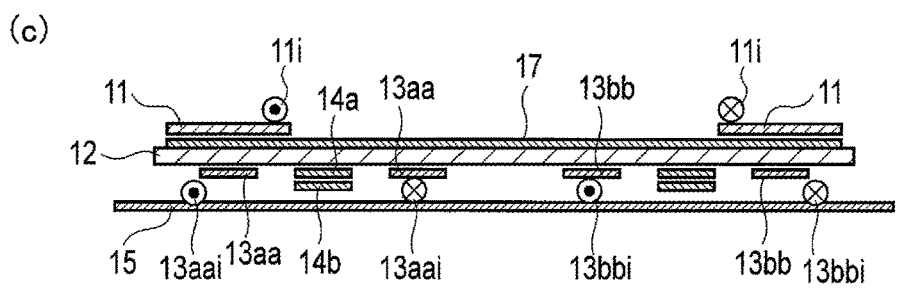

With reference to FIGS. 12(a) to 12(c), description is given of a configuration of a ground-side coil unit 7 according to a seventh embodiment. A first upper coil 13a and a first lower coil 13b are disposed in a state of being further divided into two coils, respectively. The first upper coil 13a includes two divided upper coils (13aa and 13ab) connected in parallel. The first lower coil 13b includes two divided lower coils (13ba and 13bb) connected in parallel.

When seen from the Z-axis direction, the divided upper coils (13aa and 13ab) and the divided lower coils (13ba and 13bb) have the same square shape, but are disposed in different positions. When seen from the Z-axis direction, the divided upper coils (13aa and 13ab) do not overlap with the divided lower coils (13ba and 13bb). The winding width centers (13aac and 13abc) of the divided upper coils (13aa and 13ab) correspond to the winding width center 11c of the power transmission coil 11 on the two adjacent sides. The winding width centers (13bac and 13bbc) of the divided lower coils (13ba and 13b) correspond to the winding width center 11e of the power transmission coil 11 on the two adjacent sides.

When seen from the Z-axis direction, the second upper coil 14a and the second lower coil 14b have the same square shape and are disposed in the same position, that is, stacked in the Z-axis direction.

A half of the area of the divided upper coils (13aa and 13ab) overlaps with the second upper coil 14a and the second lower coil 14b. Also, a half of the area of the divided lower coils (13ba and 13b) overlaps with the second upper coil 14a and the second lower coil 14b. The ground-side coil unit 6 includes no magnetic material walls.

The divided upper coils (13aa and 13ab) and the divided lower coils (13ba and 13bb) have the same winding direction, and in-phase alternating currents flow through the divided upper coils (13aa and 13ab) and the divided lower coils (13ba and 13bb).

Therefore, as shown in FIGS. 12(b) and 12(c), the power transmission coil 11, the divided upper coils (13aa and 13ab), and the divided lower coils (13ba and 13bb) generate magnetic fluxes in the same direction, with the currents (11i, 13aai, 13abi, 13bai, and 13bbi) simultaneously flowing in the same direction. The divided upper coils (13aa and 13ab) and the divided lower coils (13ba and 13bb) are disposed in positions where the magnetic fluxes generated by the divided upper coils (13aa and 13ab) and the divided lower coils (13ba and 13bb) cancel out the magnetic flux 11G generated by the power transmission coil 11 in the magnetic material plate 12. Therefore, iron loss and heat generation can be suppressed in the magnetic material plate 12 by reducing the magnetic flux density increased in the magnetic material plate 12 adjacent to the power transmission coil 11.

As described above, when seen from the Z-axis direction, a half of the area of the divided upper coils (13aa and 13ab) and the divided lower coils (13ba and 13bb) overlaps with the second upper coil 14a and the second lower coil 14b. More specifically, when seen from the direction of the magnetic flux passing through the power transmission coil 11, a half of the area of the first filter coil (13aa, 13ab, 13ba, and 13bb) overlaps with the second filter coil (14a and 14b). Thus, the magnetic coupling coefficient of the first filter coil (13aa, 13ab, 13ba, and 13bb) and the second filter coil (14a and 14b) can be reduced.

Although the subject matter of the present invention has been described above with reference to the embodiments, it is apparent to those skilled in the art that the present invention is not limited to the description of the embodiments, but various modifications and alterations may be made.

For example, while the planar shape of each coil and the shape of the magnetic material wall 16 are represented by the square shape with the common center in FIGS. 1(a) 4(a), 5(a), and 10(a), a concentric shape may be adopted.

REFERENCE SIGNS LIST

1a, 1b, 2, 3, 4, 5, 6, 7 ground-side coil unit
11 power transmission coil
11c, 13c, 14c winding width center
11G, 13G, 14G magnetic flux
11i, 13i, 14i current
12 magnetic material plate
13 first filter coil
14 second filter coil
15 base plate
16 magnetic material wall

The invention claimed is:

1. A ground-side coil unit for use in wireless power supply, comprising:
    a power transmission coil configured to transmit electric power to a power reception coil in a wireless manner;
    a magnetic material plate disposed adjacent to the power transmission coil; and
    a first filter coil connected in series with the power transmission coil and facing the power transmission coil with the magnetic material plate interposed therebetween,
    wherein the first filter coil is disposed in a position where a magnetic flux generated by the first filter coil cancels out a magnetic flux generated by the power transmission coil in the magnetic material plate.

2. The ground-side coil unit according to claim 1, wherein in-phase alternating currents flow through the power transmission coil and the first filter coil, and winding directions of the power transmission coil and the first filter coil are the same.

3. The ground-side coil unit according to claim 1, wherein reversed-phase alternating currents flow through the power transmission coil and the first filter coil, and winding directions of the power transmission coil and the first filter coil are opposite to each other.

4. The ground-side coil unit according to claim 1, wherein, when seen from a direction of a magnetic flux passing through the power transmission coil, winding width centers of at least two of a plurality of sides of the first filter coil correspond to a winding width center of the power transmission coil.

5. The ground-side coil unit according to claim 1, wherein, when seen from a direction of a magnetic flux passing through the power transmission coil, winding width centers of at least two of a plurality of sides of the first filter coil are positioned between a winding width center of the power transmission coil and an inner circumferential edge of the power transmission coil.

6. The ground-side coil unit according to claim 1, wherein
    the first filter coil includes a first upper coil and a first lower coil, which are connected in series with both ends of the power transmission coil, and
    the first upper coil and the first lower coil are magnetically coupled to each other.

7. The ground-side coil unit according to claim 6, wherein the first upper coil and the first lower coil are arranged in parallel in a long-side direction of a parking space where the ground-side coil unit is provided.

8. The ground-side coil unit according to claim 6, wherein the first upper coil and the first lower coil are arranged in parallel in a short-side direction of a parking space where the ground-side coil unit is provided.

9. The ground-side coil unit according to claim 1, further comprising:
    a second filter coil connected to a power transmission coil side of the first filter coil; and
    a magnetic material wall configured to separate the first filter coil from the second filter coil, wherein
    the second filter coil is disposed facing the power transmission coil with the magnetic material plate interposed therebetween.

10. The ground-side coil unit according to claim 1, further comprising:
    a second filter coil connected to a power transmission coil side of the first filter coil, wherein
    the second filter coil is disposed facing the power transmission coil with the magnetic material plate interposed therebetween, and
    when seen from a direction of a magnetic flux passing through the power transmission coil, a half of an area of the first filter coil overlaps with the second filter coil.

* * * * *